(12) United States Patent
Shkunov et al.

(10) Patent No.: US 8,014,426 B2
(45) Date of Patent: Sep. 6, 2011

(54) OPTICAL DEVICE AND METHOD OF CONTROLLING A REFRACTIVE INDEX PROFILE IN THE OPTICAL DEVICE

(75) Inventors: Vladimir V. Shkunov, Torrance, CA (US); David A. Rockwell, Culver City, CA (US); Scott T. Johnson, Torrance, CA (US)

(73) Assignee: Raytheon Company, Waltham, MA (US)

( * ) Notice: Subject to any disclaimer, the term of this patent is extended or adjusted under 35 U.S.C. 154(b) by 427 days.

(21) Appl. No.: 12/358,608

(22) Filed: Jan. 23, 2009

(65) Prior Publication Data
US 2010/0189137 A1 Jul. 29, 2010

(51) Int. Cl.
*H01S 3/30* (2006.01)
*G02B 6/02* (2006.01)
*G02B 6/36* (2006.01)

(52) U.S. Cl. .............. 372/6; 372/34; 385/124; 385/127

(58) Field of Classification Search ................ 385/123, 385/124, 12, 141, 126, 127, 128; 372/6, 372/34, 108, 109; 359/341.1, 341.5, 342
See application file for complete search history.

(56) References Cited

U.S. PATENT DOCUMENTS

| | | | |
|---|---|---|---|
| 3,599,114 A | 8/1971 | Snitzer et al. | 372/40 |
| 4,848,881 A | 7/1989 | Kahan et al. | 372/105 X |
| 5,046,809 A | 9/1991 | Stein | 385/49 |
| 5,131,069 A * | 7/1992 | Hall et al. | 385/142 |
| 5,386,427 A | 1/1995 | Zayhowski | 372/34 |
| 5,594,578 A * | 1/1997 | Ainslie et al. | 398/82 |
| 5,646,773 A | 7/1997 | Injeyan et al. | 359/337 |
| 5,864,644 A | 1/1999 | DiGiovanni et al. | 385/43 |
| 5,909,529 A | 6/1999 | Bhagavatula | 385/147 |
| 5,930,433 A | 7/1999 | Williamson et al. | 385/116 |
| 6,014,391 A | 1/2000 | Byren | 372/34 |
| 6,229,939 B1 * | 5/2001 | Komine | 385/29 |
| 6,317,548 B1 * | 11/2001 | Rockwell et al. | 385/123 |
| 6,363,194 B1 | 3/2002 | DiGiovanni et al. | 385/123 |
| 6,400,871 B1 * | 6/2002 | Minden | 385/39 |
| 6,477,295 B1 * | 11/2002 | Lang et al. | 385/31 |
| 6,529,318 B1 * | 3/2003 | Kaneda et al. | 359/341.32 |

(Continued)

OTHER PUBLICATIONS

International Search Report & Written Opinion dated Apr. 22, 2010 of PCT/US2010/021640 filed Jan. 21, 2010 (13 pages).

(Continued)

*Primary Examiner* — Brian Healy
(74) *Attorney, Agent, or Firm* — Pillsbury Winthrop Shaw Pittman LLP

(57) ABSTRACT

An optical device includes an optical material comprising active dopant ions and absorber dopant ions spaced apart from the active dopant ions. The active dopant ions are provided to absorb a first radiation and convert a portion of the first radiation into sensible heat. A concentration profile of the absorber dopant ions is selected to absorb a second radiation different from the first radiation and optionally the first radiation in at least one direction of the optical material so as to control a refractive index profile in the at least one direction of the optical material. In another embodiment, a method of controlling a refractive index profile in an optical material includes exciting active dopant ions in the optical material with a first radiation, the active dopant ions converting at least a portion of the first radiation into sensible heat; and exciting absorber dopant ions in the optical material with a second radiation to control a refractive index profile in at least one direction of the optical material.

75 Claims, 6 Drawing Sheets

U.S. PATENT DOCUMENTS

| | | | | |
|---|---|---|---|---|
| 6,888,859 B2 * | 5/2005 | Weber et al. | | 372/34 |
| 7,164,818 B2 * | 1/2007 | Bryan et al. | | 385/33 |
| 2007/0116081 A1 | 5/2007 | Vetrovec et al. | | 372/99 |
| 2007/0230884 A1 * | 10/2007 | Minelly et al. | | 385/125 |
| 2009/0041061 A1 * | 2/2009 | Shkunov et al. | | 372/6 |
| 2010/0189137 A1 * | 7/2010 | Shkunov et al. | | 372/6 |

OTHER PUBLICATIONS

Born et al. "The Refracting Telescope", Principles of Optics, Electromagnetic Theory of Propagation, Interference and Diffraction of Light, Chapter 6.3, pp. 267-268, Cambridge University Press, 1968.

Neumann "Wave Beam Guided by a Straight Single-Mode Fiber", Chapter 2.2-2.4, pp. 12-16, Single-Mode Fibers Fundamentals, Springer-Verlag, NY, 1988.

Neumann "The Fundamental Fiber Mode", Chapter 5, pp. 61-141, Single-Mode Fibers Fundamentals, Springer-Verlag, NY, 1988.

Tamir "Waveguide Horns", Chapter 3.5, pp. 125-134, Guided-Wave Optoelectronics, Springer-Verlag, Berlin, 1988.

Bass et al. "Optical Elements", pp. 6.22, Handbook of Optics, vol. 11, Devices, Measurements and Properties, McGraw-Hill, Inc. NY, 1995.

Bass et al. "Axial Gradient Lenses", pp. 9.5, Handbook of Optics, vol. 11, Devices, Measurements and Properties, McGraw-Hill, Inc. NY, 1995.

Taverner et al. "158-uJ Pulses from a Single-Transverse-Mode, Large-Mode-Area Erbium-Doped Fiber Amplifier", pp. 378-380, Optics Letters, vol. 22, No. 6, Mar. 15, 1997, Optical Society of America.

Arkwright et al. "Experimental and Theoretical Analysis of the Resonant Nonlinearity in Ytterbium-Doped Fiber", pp. 798-806, Journal of Lightwave Technology, vol. 16, No. 5, May 1998.

Snyder et al. "Step-Profile Waveguides", Chapter 12, pp. 239-248, Optical Waveguide Theory, Kluwer Academic Pubishers, Boston, 2000.

Koechner "Thermo-Optic Effects and Heat Removal", Chapter 7, pp. 406-468, Optical Sciences, Solid-State Laser Engineering, Fifth Edition, Springer-Verlag, NY, 2000.

Siegman "Propagating Modes in Gain-Guided Optical Fibers", pp. 1617-1628, Optical Society of America, vol. 20., No. 8, Aug. 2003.

Hecht "Optical Systems", Chapter 5.7, pp. 209, Optics, Fourth Edition, Pearson Education, Singapore, 2004.

Witkowska et al. "All-Fiber Anamorphic Core-Shape Transitions", pp. 2672-2674, Optics Letters, vol. 31, No. 18, Sep. 15, 2006, Optical Society of America.

Ramachandran et al. "Scaling to Ultra-Large-Aeff Using Higher-Order-Mode Fibers", 2 pp., CThAA2, Conference on Lasers and Electro-Optics 2006 Technical Digest, Optical Society of America.

Oh et al. "Increased Pulsed Amplifier Efficiency by Manipulating the Fiber Dopant Distribution", 2 pp., CTuQ3, Conference on Lasers and Electro-Optics 2006 Technical Digest, Optical Society of America.

Dong et al. "Leakage Channel Optical Fibers with Large Effective Area", pp. 1689-1697, vol. 24, No. 8, Aug. 2007, Optical Society of America.

Marciante "Gain Filtering for Single-Spatial-Mode Operation of Large-Mode-Area Fiber Amplifiers", 2 pp., JTuA86, Conference on Lasers and Electro-Optics 2007 Technical Digest, Optical Society of America.

Betin et al. "200 W Phase-Conjugate Mirror for CW Radiation", pp. 1-6, Sciencedirect, Optics Communications, Feb. 26, 2008.

Galvanauskas et al. "Effectively-Single-Mode Large Core Passive and Active Fibers with Chirally-Coupled-Core Structures", 2 pp., CMB1, Conference on Lasers and Electro-Optics 2008 Technical Digest, Optical Society of America.

Koplow et al. "Single-Mode Operation of a Coiled Multimode Fiber Amplifier", pp. 442-444, Optics Letters, vol. 25, No. 7, Apr. 1, 2000, Optical Society of America.

* cited by examiner

OPTICAL DEVICE AND METHOD OF CONTROLLING A REFRACTIVE INDEX PROFILE IN THE OPTICAL DEVICE

BACKGROUND

The present disclosure pertains to an optical device and a method for controlling a refractive index profile in the optical device.

Fiber lasers can be used in many applications and are increasingly sought after in certain applications as substitutes to solid state lasers. Fiber lasers are more compact, reliable, can produce a good quality beam, have high efficiency, and can provide robust single-mode output. In addition, fiber lasers can be used in an all-fiber architecture without free-space optics and hence may not require a rigid optical bench. Over the past decade, output powers of fiber lasers have been increased several orders of magnitude, from the watt-level to multi-kW powers, making fiber lasers competitive with solid state based lasers.

The limits in scaling up power in fiber lasers include non-linear effects and optical distortions due to heat generated within the laser medium. Reliable, long-term operation requires that the fiber be cooled. In addition, heat flow in the fiber medium can establish a fast-axis temperature gradient within the fiber. Temperature gradients can also arise due to non-uniform cooling, heat spreading, and several other factors. These temperature gradients can introduce a varying transverse refractive index profile due to the fact that, generally, the refractive index depends on the local temperature. Conventional low power fiber amplifiers can be immune to such transverse index gradients, since the variation in index profile of the fiber material (built-in index profile) is generally greater than the thermally induced variation in the index. However, in some high-power designs, the built-in index profiles are designed to be much weaker than in conventional fibers. As a result, the thermally induced transverse index profiles can be problematic.

In a fiber laser, accumulated thermal lensing due to variation in the index profile can create strong refraction effects which can result in a large radiative loss that can significantly degrade the laser efficiency and output beam quality.

SUMMARY

One embodiment of this disclosure provides an optical device including an optical material comprising active dopant ions and absorber dopant ions spaced apart from the active dopant ions. The active dopant ions, are provided to absorb a first radiation and convert a portion of the first radiation into sensible heat. The absorber dopant ions are selected to absorb a second radiation different from the first radiation and optionally the first radiation. A concentration profile of the absorber dopant ions in at least one direction of the optical material is selected to control a refractive index profile in the at least one direction of the optical material.

Another embodiment of this disclosure provides a method of controlling a refractive index profile in an optical material. The method includes exciting active dopant ions in the optical material with a first radiation, the active dopant ions converting at least a portion of the first radiation into sensible heat; and exciting absorber dopant ions in the optical material with a second radiation to control a refractive index profile in at least one direction of the optical material.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
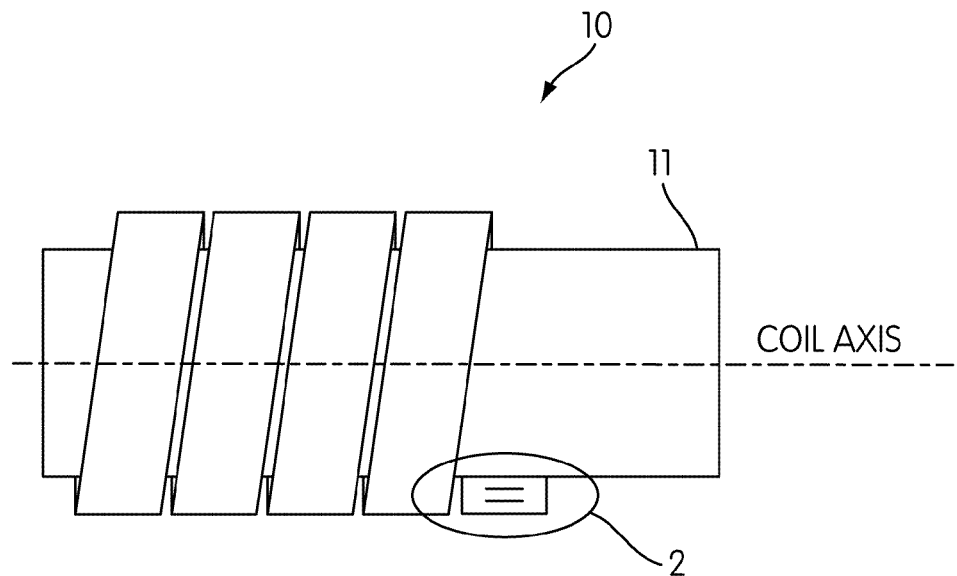
FIG. 1 is a schematic diagram of a fiber laser wound in a spiral coil around a carrier, according to an embodiment.
Figure 2:
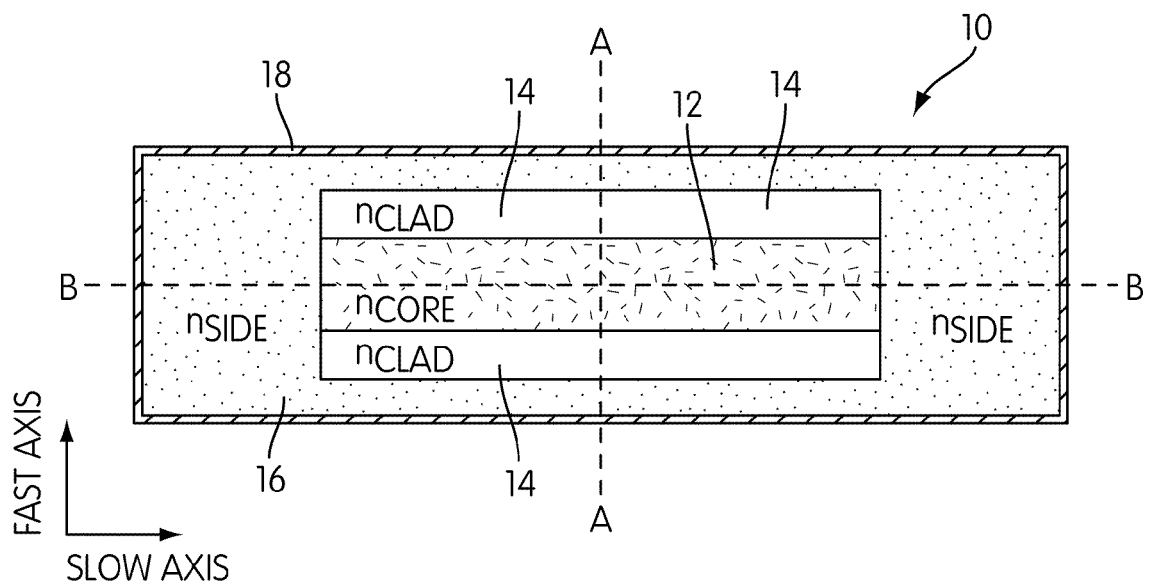
FIG. 2 is a schematic diagram of a cross-section of the fiber laser, according to an embodiment.

FIG. 1 is a schematic diagram of fiber laser 10 wound in a spiral coil around carrier 11, according to an embodiment of this disclosure. In this embodiment, fiber 10 has a semi-guiding high aspect ratio core (SHARC) architecture. A detailed description of the SHARC architecture can be found in co-pending U.S. patent application Ser. No. 11/891,328, pending, filed on Aug. 9, 2007 and entitled "Method and Apparatus for Generation and Amplification of Light in a Semi-Guiding High Aspect Ratio Core Fiber," which is incorporated herein by reference in its entirety. The SHARC fiber laser has a ribbon-like geometry which allows fiber laser 10 to be coiled in a spiral conformation around carrier 11, as shown in FIG. 1. Carrier 11 can include a cooling system or cooling structure for cooling fiber laser 10 during operation of fiber laser 10. FIG. 2 is a schematic diagram of a cross-section of fiber laser 10, according to an embodiment of the present disclosure. Fiber laser 10 includes core 12, signal claddings 14, pump cladding 16 and coating 18. Core 12 is disposed, or sandwiched, between two signal claddings 14. Core 12 and signal claddings 14 are surrounded by pump cladding 16. Coating 18 covers pump cladding 16. In one embodiment, coating 18 can be a polymer coating or any other flexible coating. SHARC fiber 10 has a rectangular cross-section, as shown in FIG. 2. In one embodiment, rectangular core 12 of SHARC fiber 10 has an aspect ratio that can lie between about 30:1 to 100:1 or more depending on laser power generation goal. The slow-axis (wide dimension) and fast-axis (narrow dimension) directions are shown in FIG. 2.

As shown in FIG. 2, core 12 and claddings 14 are centered within fiber 10 such that vertical axis AA divides fiber 10 into two substantially identical symmetrical halves and horizontal axis BB divides fiber 10 into two substantially identical symmetrical halves. However, as can be appreciated, core 12 and/or claddings 14 do not need to be centered within fiber 10. For example, in one embodiment, core 12 and claddings 14 can be offset from the axis of symmetry BB of fiber 10 (e.g., core 12 and cladding 14 can be positioned at the "top" or "bottom" in fiber 10 so as to be closer to the top or bottom portion of coating 18). Alternatively or in addition, core 12 and claddings 14 can be offset from axis of symmetry AA of fiber 10 (e.g., core 12 and cladding 14 can be positioned at a right side or a left side in fiber 10 so as to be closer to the right side or the left side portion of coating 18).

Core 12 comprises an active dopant material. The active dopant material can be distributed in core 12 according to a desired cross-sectional distribution in core 12, and/or along a length of fiber laser 10, to provide optical amplification within the core. In one embodiment, the active dopant material can be localized in core 12 to provide the desired spatial overlap with a signal beam to be amplified. The active dopant material can be active dopant ions (active lasing dopant ions or active amplifying dopant ions) such as Ytterbium ions ($Yb^{3+}$), Erbium ($Er^{3+}$), or both. The cladding 14 which has a lower refractive index than the core can provide guiding of the optical signal along the fast axis. In one embodiment, the claddings 14 comprises a radiation absorber dopant material. The absorber dopant material can be absorber dopant ions such as Praseodymium ions ($Pr^{3+}$) or Dysprosium ions ($Dy^{3+}$) depending upon the active dopant ions used. In one embodiment, the absorber dopant ions substantially surround the active dopant ions. In another embodiment, the active dopant ions can substantially surround the absorber dopant ions. The absorber dopant ions can be distributed across the fiber cross-section in a desired fashion, and/or along fiber laser 10, to achieve a desired index profile, as will be explained further in detail in the following paragraphs. For example, in one embodiment, the absorber dopant ions can be distributed in claddings 14 according to a desired distribution to control the index within claddings 14. In another embodiment, the absorber dopant ions can be distributed within core 12 spatially separated from the active dopant ions. For example, the absorber dopant ions can complement the active dopant ions in an area within core 12 occupied by a propagating signal mode. In other words, the absorber dopant ions can be distributed such that the absorber dopant ion concentration is greatest in areas where the active dopant ion concentration is lowest, and vice versa, the absorber dopant ion concentration is lowest in areas where the active dopant ion concentration is highest.

In one embodiment, one purpose of the absorber dopant ions (in claddings 14 and/or in core 12) is to generate a "guard heat" within fiber 10 to create a desired thermal environment within core 12, thereby minimizing temperature gradients that would otherwise arise due to heat conduction to cooled fiber surfaces.

In one embodiment, a primary or main power pump (a first radiation) is used to excite or pump the active dopant ions and a secondary or auxiliary power pump (a second radiation) is used to excite or pump the absorber dopant ions. In one embodiment, core 12 comprises active dopant ions $Yb^{3+}$ and the signal claddings 14 comprise rare-earth praseodymium absorber dopant ions $Pr^{3+}$. The active dopant ions $Yb^{3+}$ are typically pumped and absorb radiation (the first radiation) at a wavelength around 976 nm, and the absorber praseodymium ions $Pr^{3+}$ absorb radiation (the second radiation) at a wavelength around 1470 nm. In another embodiment, core 12 comprises active dopant ions $Er^{3+}$ and signal claddings 14 comprise absorber rare-earth praseodymium dopant ions $Dy^{3+}$. The active dopant ions $Er^{3+}$ are typically excited or pumped and absorb radiation (the first radiation) at a wavelength around 980 nm or resonantly excited or pumped at wavelengths between about 1480 nm and about 1530 nm, and the absorber dopant ions $Dy^{3+}$ are excited or pumped and absorb radiation (the second radiation) at a wavelength around 1225 nm. In one embodiment, the main power pump and the auxiliary power pump are injected into the fiber such that the pump power and the auxiliary power propagate longitudinally, i.e., along a length of the fiber. The main and auxiliary power pumps can be injected at one end of fiber 10, at both ends of fiber 10, or at various points along fiber 10. The main power pump and the auxiliary power pump can be injected at one location or at different locations along fiber 10. For example, the main power pump can be injected at one end of fiber 10 while the auxiliary pump can be injected at an opposite end of fiber 10 or a different point along fiber 10.

The main pump and the auxiliary pump can be selected to have the same wavelength or different wavelengths depending on the active dopant ions and the absorber dopant ions incorporated in the fiber. For example, in one embodiment, the absorber dopant ions can be selected to absorb radiation with the same wavelength as the active dopant ions. In this case, one pump can be used to pump both the active dopant ions as well as the absorber dopant ions. In another embodiment, the absorber dopant ions and active ions can be selected to absorb radiation at different wavelengths. In this case, the main pump at a first wavelength can be used to pump or excite the active dopant ions, and the auxiliary pump at a second wavelength can be used to pump or excite the absorber dopant ions.

A small fraction of the main pump power absorbed by the active laser ions is thermalized within active core 12. This fraction of the pump power is denoted "sensible heat" The sensible heat arises from the energy difference between an absorbed pump photon and an emitted signal photon. For example, for a Yb-doped fiber, i.e., for $Yb^{3+}$ active dopant ions, the sensible heat corresponds to approximately 8% of the main pump power. On the other hand, the absorber dopant material (e.g., the absorber dopant ions $Pr^{3+}$) is selected to absorb at least a portion of the auxiliary pump power and to convert substantially all of the absorbed auxiliary pump power to heat. Therefore, to a first approximation, the auxiliary power need only amount to about 8% of the pump power to achieve a desired guard-heat effect, e.g., to substantially homogenize the temperature across fiber 10.

For example, if a main pump radiation (e.g., at a wavelength centered around 976 nm) is launched into fiber 10 at a power level adequate to obtain a desired power output, an auxiliary pump beam (e.g., at a wavelength centered around 1470 nm) can be launched into fiber 10 at a power level such that the overall heat deposition across the mode area can be substantially homogeneous. As a result, a uniform temperature distribution across the propagating mode area can be obtained. In one embodiment, the concentrations of the active dopant ions (e.g., $Yb^{3+}$) and the absorber dopant ions (e.g., $Pr^{3+}$) can be selected to provide the same absorption rates along a length, i.e., an absorption length, of fiber 10 for the main pump and auxiliary pump wavelengths. This allows to maintain a substantially constant ratio between the main and auxiliary powers along the entire length of fiber 10. In this way, complementary thermal loading patterns for the sensible heat and the guard heat can be accurately maintained along the entire length of the fiber. In another embodiment, the wavelength of the main pump or auxiliary pump can be varied to provide desired absorption rates of the active dopant ions and/or the absorber dopant ions to control the index profile.

The main pump power and the auxiliary pump power can also be varied independently of each other. As a result, if the relative doping densities deviate from specified values or if design calculations are slightly in error, a desired thermal control and thus a desired index control can be achieved by adjusting or tuning the main pump, the auxiliary pump or both. This provides another degree of freedom to optimize the overall performance of fiber laser 10. It is worth noting that the absorber dopant ions are not required to have zero absorption at the main pump (e.g., at the lasing ion pump wavelength) nor that the active dopant ions have zero absorption at the auxiliary pump (e.g., at the absorber ion pump wavelength). Indeed, for example, the absorber dopant ions can slightly absorb radiation of the main pump (e.g., at the lasing ion pump wavelength) and/or the lasing ions can slightly absorb radiation of the auxiliary pump (e.g., at the absorber ion pump wavelength). The absorber ion and the lasing ion are each predominantly excited by their respective excitation or pump beams without exclusively limiting each excitation pump beam to its intended target ion. For example, the absorber dopant ions can absorb the auxiliary pump (second radiation) and optionally the main power pump (first radiation) to convert substantially at least a portion of the second radiation and optionally at least a portion of the first radiation into guard heat.

Figure 3:
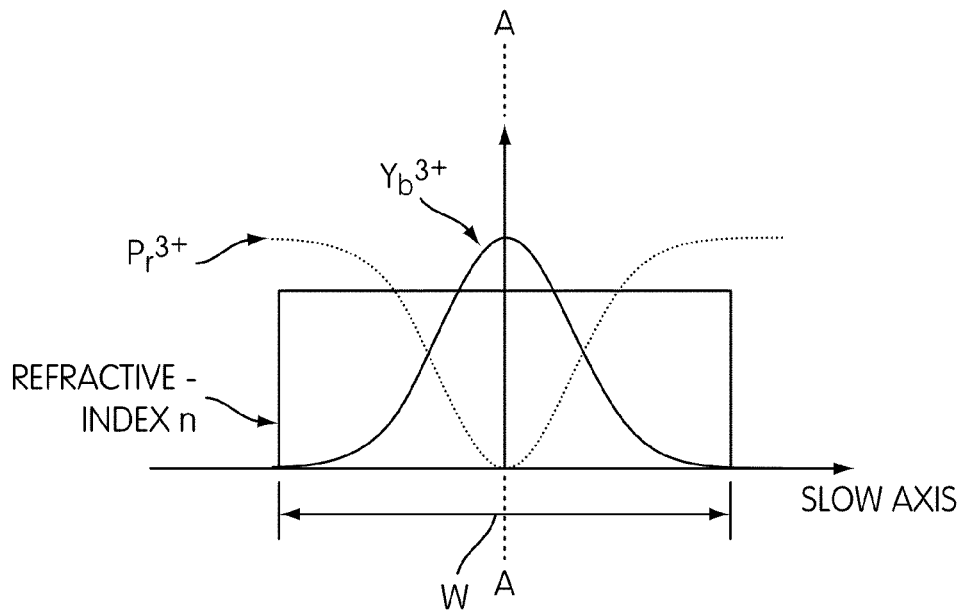
FIG. 3 is a set of plots showing a flat refractive index profile of the overall fiber laser and concentration profiles of active laser dopant ions and absorber dopant ions along the slow axis dimension of the laser fiber, according to an embodiment.

FIG. 3 is a set of plots showing a flat refractive index profile of the overall fiber laser 10 and the concentration profiles of the active laser dopant ions (e.g., $Yb^{3+}$ ions) and absorber dopant ions (e.g., $Pr^{3+}$ ions) along the slow axis dimension of laser fiber 10, according to an embodiment of the present disclosure. As shown in FIG. 3, the concentration distribution of the $Yb^{3+}$ ions and the concentration distribution of the $Pr^{3+}$ ions in the fiber laser are complementary. In one embodiment, the $Yb^{3+}$ concentration has a Gaussian-like distribution along the slow axis direction with a maximum of the distribution occurring at fiber axis AA (as shown in FIG. 2), while the $Pr^{3+}$ concentration is an inverted Gaussian-like distribution with a minimum of the distribution occurring at fiber axis AA. Although the complementary distribution is shown herein for a SHARC fiber laser, as it can be appreciated, this type of complementary concentration distribution of active dopant ions and absorber dopant ions can be implemented in any type of laser fiber architecture. For example, the complementary concentration distribution can be implemented in a fiber laser having a circular cross-section or any other geometry.

Furthermore, although the overall refractive index profile for the non-pumped fiber laser 10 is shown to be uniform across the slow-axis dimension, other refractive index profiles can also be implemented. For example, an overall parabolic refractive index profile or an overall linear refractive index gradient to impose some beam steeling can be implemented with appropriate selection of dopant ions concentrations, i.e., concentration of the active dopant ions, concentration of the absorber dopant ions, or passive dopant ions (e.g., Aluminum) in the laser fiber. In general, the addition of dopant ions such as $Yb^{3+}$ and $Pr^{3+}$, or any of a number of other elements into glass core 12 or cladding 14 can change the profile of the "built-in" or static refractive index. By static or "built-in" refractive index, it is meant a refractive index in the absence of pump radiation. In addition, by adding another dopant, such as Aluminum (Al) with a certain concentration and distribution profile, a desired overall refractive index profile can be achieved.

In one embodiment, the dopant concentration distributions are continuous, i.e., are substantially free of discontinuities. By providing dopant concentration distributions substantially free of discontinuities, potential reflections of the off-axis components of the propagating signal beam that would otherwise occur when there are discontinuities in the dopant concentration, can be eliminated. Hence, one aspect of an embodiment avoids discrete steps in the dopant concentration distribution because such steps can introduce an index step that cannot be smoothed out by thermal effects as the temperature across such a step boundary is continuous. The discrete steps in the dopant concentrations can lead to discrete steps in the index which can interrupt free diffraction in the slow-axis direction and can produce reflections of the off-axis components of the propagating signal beam. These reflections can degrade the beam quality of the laser fiber output beam. Consequently, it may be desirable to have gradual or continuous index changes as opposed to abrupt index changes.

During operation, laser fiber 10 generates sensible and fluorescence waste heat. In one embodiment, the sensible heat is generated directly in active core 12 due the difference in energy between the pump photon energy and the emitted signal photon energy. The sensible heat is transferred via thermal conduction outwardly to the perimeter of fiber laser 10 before being rejected by thermal conduction or thermal convection. In one embodiment, the magnitude of the sensible heat is about 8% of the absorbed pump power. Assuming the length of the fiber is, for example, about 4 m and bi-directional pumping is used with pump power injected at one-meter intervals, and assuming a 90% absorption of a 3 kW, 976 nm pump, the highest heat load (near the pump injection points) is about 2.5 W/cm. The heat load at the mid-points between injection points is about 1 W/cm. The fluorescence heat depends on the operational gain. The fluorescence heat can be about 3 times greater than the sensible heat. However, the fluorescence heat is radiated from fiber 10 in the form of near-infrared (near-IR) optical power. Fiber 10 is coated with coating material 18 such as a polymer material (e.g., an acrylate) that is highly transmissive at the fluorescence wavelength. Coating material 18 allows the fluorescence heat to be collected and rejected in an absorbing structure away from fiber 10. For example, by making the surfaces of carrier structure 11 including a cooling structure either optically transmissive or highly reflective at the fluorescence wavelength, the effects of the fluorescence can be segregated away from the fiber 10 and the sensible heat can be managed independently of the fluorescence.

Figure 4:
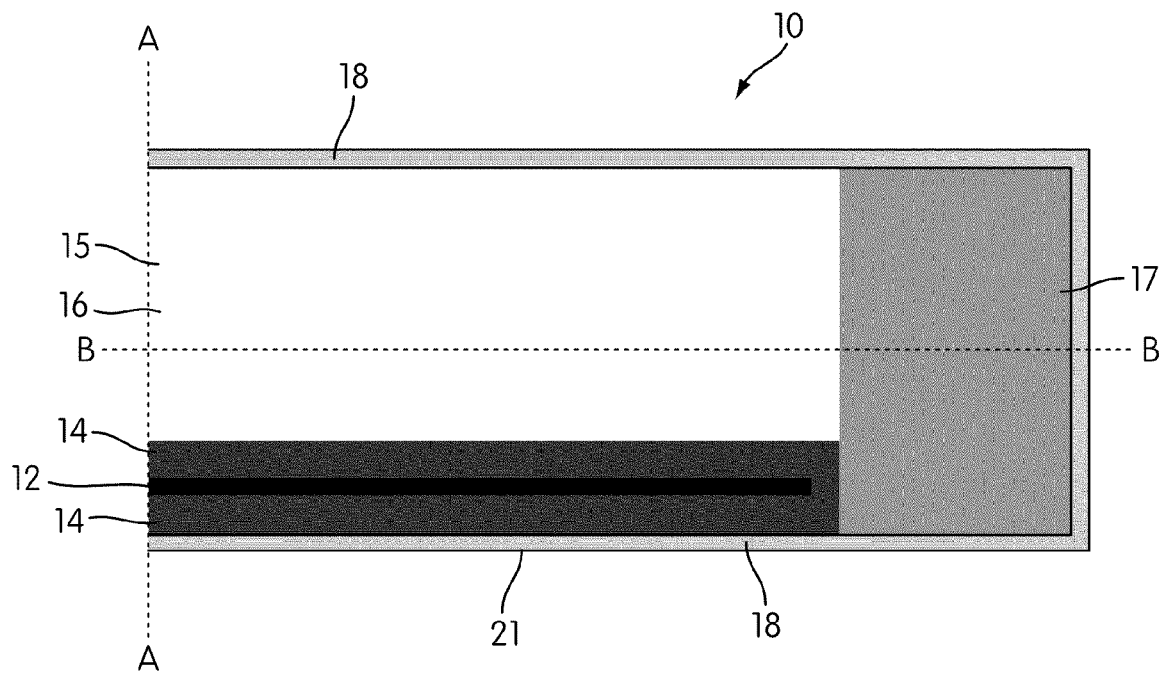
FIG. 4 shows a finite-difference two dimensional (2D) thermal model of one-half of the cross-section of laser fiber, according to an embodiment.

FIG. 4 shows a finite-difference two dimensional (2D) thermal model of one-half (relative to mid-axis AA) of the cross-section of laser fiber 10, according to an embodiment. In this model, core 12 of fiber 10 is offset from axis of symmetry BB to reduce thermal conduction path length to the heat sink. Sensible heat generation occurs in active core 12 as a function of the active dopant ions (in this example $Yb^{3+}$).

The absorber dopant ions (in this example $Pr^{3+}$) also generate heat in cladding regions 14 above and below active core 12. Top region 15 and side region 17 of pump cladding 16 do not generate heat. Fiber 10 (e.g., fused silica fiber) is surrounded by coating 18 (e.g., acrylate polymer coating layer). In one embodiment, the thickness of coating 18 is approximately 20 μm. However, as it can be appreciated, other thicknesses can be selected as desired. The thermal conductivity of fused silica is about 1.38 W/m° C. at room temperature and increases slightly with increasing temperature. The thermal conductivity of the acrylate polymer coating layer is about 0.2 W/m° C.

Figure 5:
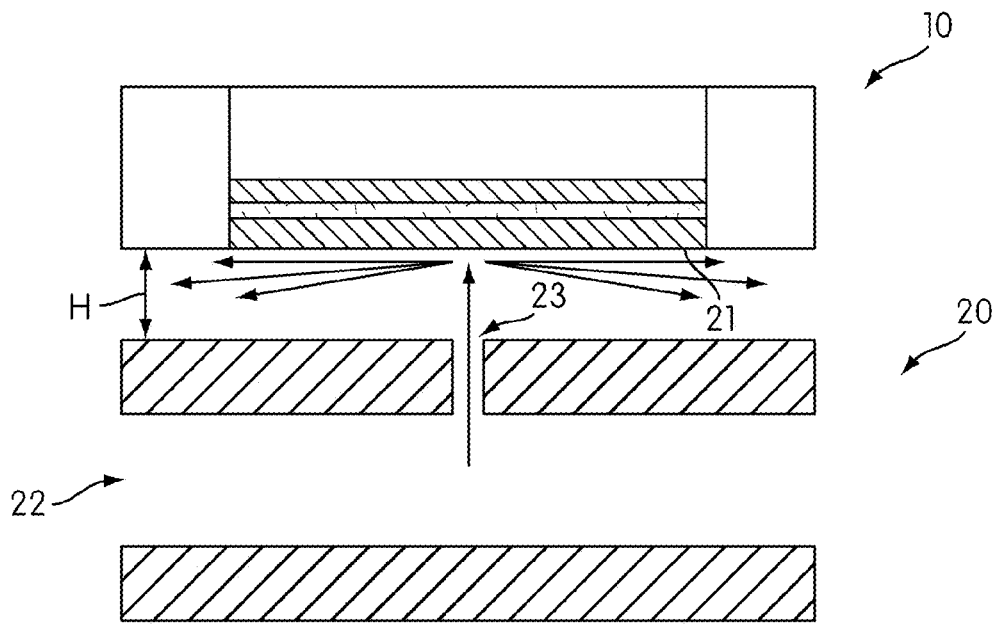
FIG. 5 is a schematic diagram of a cooling system for cooling the fiber laser, according to an embodiment.

In the thermal model, it is assumed that an air-jet impinges on bottom surface 21 of fiber 10. FIG. 5 is a schematic diagram of a cooling system, according to an embodiment. Cooling system 20 includes manifold 22 having one or more openings 23 (e.g., holes, slots, etc.). A coolant disposed inside manifold 22, e.g., pressurized air, is directed towards fiber 10 through one or more openings 23 in the form of an air-jet to impinge upon bottom surface 21 of fiber 10 so as to eliminate or reject sensible heat generated in fiber 10. As shown in FIG. 5, fiber 10 is spaced apart from manifold 22 by gap H so as to allow the air-jet to expand before reaching bottom surface 21 of fiber 10. In one embodiment, the air pressure in manifold 22 is less than 2 psig. In these conditions, one or more openings 23 can produce a laminar jet flow that is substantially free from turbulence. In one embodiment, the total flow rate to achieve sensible heat rejection from a fiber having a length of about 4 meters is less than 100 ft$^3$/min.

Figure 6:
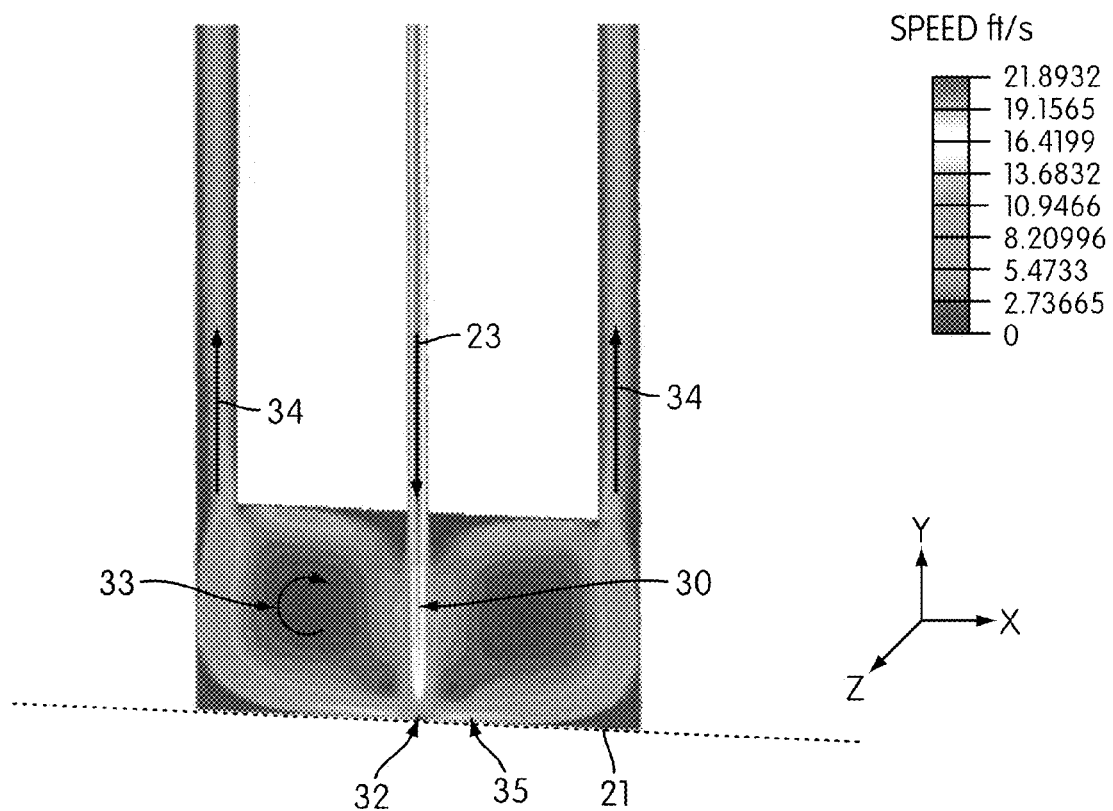
FIG. 6 shows a contour map of fluid flow speed contours obtained with a computational fluid dynamics simulation for a jet of fluid, according to an embodiment.

FIG. 6 shows a contour map of fluid flow speed (FFS) contours obtained with a computational fluid dynamics (CFD) simulation for a jet of fluid 30 (e.g., air or other gas) through slot 23 impinging bottom surface 21 of fiber 10, according to an embodiment. Iso-contours are plotted for equal fluid flow speeds (FFS). The contour map shows a stagnation zone 32 of the fluid at the boundary with the bottom surface 21 of fiber 10. Exhaust ports 34 to exhaust the fluid are also shown. The contour map also shows a development of fluid recirculation cell 33. The simulation is performed for a slot having a dimension of 0.0025 inch (0.0635 mm). However, as it can be appreciated, other slot dimensions can be used. The contour map shows that a maximum local cooling of the fiber occurs where the fluid jet potential stagnates on target bottom surface 21 of fiber 10. The cooling performance, as determined by the local heat transfer coefficient, decreases monotonically in a lateral direction as the thermal boundary layer builds within wall jet 35 at the interface with bottom surface 21 of fiber 10. At the boundary with bottom surface 21 of fiber 10, the cooling profile resembles a Gaussian-like profile. The Gaussian-like profile can be used in combination with the Gaussian-like ion concentration profiles of the dopants in core 12 and cladding regions 14 of fiber 10 along with possible thermal masking of fiber bottom surface 21 to control the active core temperature gradients.

Figure 7:
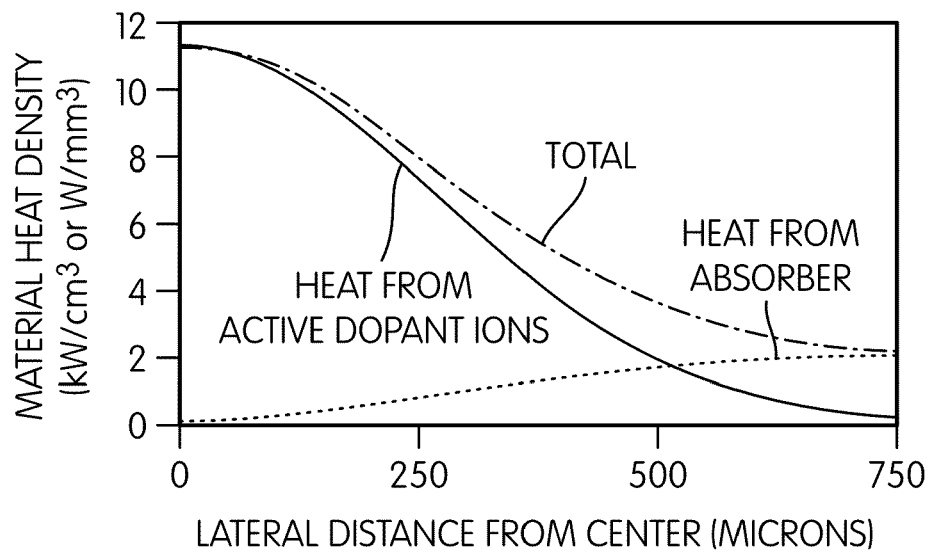
FIG. 7 shows individual and combined heat generation profiles for a Gaussian-like ion doping in the active core and an anti-Gaussian-like ion doping in the cladding layers, according to an embodiment.

FIG. 7 shows individual and combined heat generation profiles for a Gaussian-like $Yb^{+3}$ doping in the active core and an anti-Gaussian-like $Pr^{+3}$ doping in the cladding layers, according to an embodiment. The ordinate axis represents the material heat density (in kW/cm$^3$ or W/mm$^3$) and the abscissa axis represents the lateral distance from the center of fiber 10 (in μm). Three heat generation profiles are plotted, including a first heat profile in the active core labeled "heat from active dopant ions", a second profile in the cladding layers labeled "heat from absorber", and a third heat profile representing the combined heat generation in the core and the cladding labeled "total." The first heat profile in the active core generated by the active dopant ions has a Gaussian-like profile, the second heat profile generated by the absorber ions has an anti-Gaussian-like profile, and the third heat profile, corresponding to the combined generated heat, resembles a "flattened" Gaussian-like profile. Although half of the profiles are plotted herein, it can be appreciated that the other half is a mirror image of the plotted half-profiles. The first, second and third profiles are obtained for a simplified one dimensional closed-form model that concentrates all of the cladding heat within the active core. The model is computed to determine the $Pr^{3+}$ doping concentration that results in the minimum temperature gradient for a jet impingement heat transfer profile. A simulation is performed by making an initial assumption on the $Pr^{3+}$ doping concentration to compute an initial temperature gradient. By iteration, by varying (increasing and/or decreasing) the $Pr^{3+}$ doping concentration, other temperature gradients can be computed. As a result, a minimum temperature gradient can be found, among all the iterations The heat transfer Gaussian-like profile determined above in the CFD simulation can be used to determine the $Pr^{3+}$ doping concentration that results in a minimum temperature gradient for the jet-impingement heat-transfer profile. The one dimensional model predicts an active temperature gradient less than 0.5° C. with a $Pr^{3+}$-doping heat generation equal to about 50%, i.e., about half, of the $Yb^{3+}$-doping heat, generation in the active core.

For example, in one embodiment, in order to obtain a good quality output laser beam, the sensible heat is controlled such that the peak core temperature is under 125° C. and the overall transverse thermal gradient within the core is less than 1° C.

Figure 8:
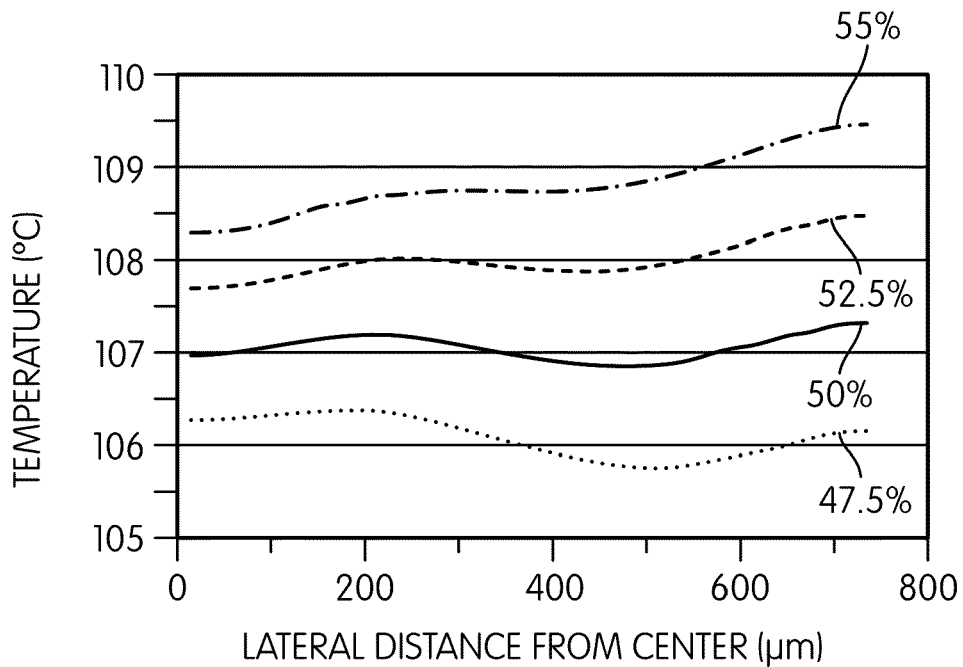
FIG. 8 shows a series of plots representing heat profiles generated within the core versus lateral distance from the center of the fiber at various ratios of guard heat to heat deposited in the core, according to an embodiment.

FIG. 8 shows a series of plots representing heat profiles generated within the core (in this example $Yb^{3+}$-doped core) versus lateral distance from the center of the fiber at various ratios (in %) of guard heat to sensible heat deposited in the core, according to an embodiment. As shown in FIG. 8, the heat profile across the core is approximately constant (around 107° C.) when the total guard heat is about 50% of the heat deposited in the core (sensible heat). These results show that the guard heat can be effective in controlling the boundary conditions on the heated core and thus control the temperature profile.

As discussed in the above paragraphs, the temperature profile can control the refractive index profile. In the particular case assumed in the thermal modeling, the objective is to obtain a flat refractive index across the slow axis direction of the core of the fiber. However, as it can be appreciated, other refractive index profiles can be established and controlled. For example, in an alternate embodiment, a refractive index with a parabolic profile can also be achieved. In addition, if the refractive index produced during fiber fabrication is slightly parabolic where the desired refractive index should be substantially flat, complementary thermal gradients can be added to flatten the parabolic profile of the refractive index or in general to reshape the profile of the refractive index to a desired profile. For example, this can enable a user to correct index-profile errors that may arise during the fabrication process of the fiber, or to correct index-profile deviations from a desired index profile due to tolerances in the fabrication process.

Most commercial fiber lasers are cooled convectively to ambient air surrounding the fiber. This may be adequate for laser radiation powers less than about 50 W to about 100 W. For higher radiation powers, the cylinder on which the laser fiber is coiled can be water cooled, and thermal conduction into the cylinder can provide additional cooling capacity. However, for even greater radiation powers, such as powers used in SHARC fibers, a more efficient cooling may be needed. In SHARC fibers, for example, the heat load can range between about 1 W/cm of fiber length to about 3 W/cm of fiber length. The SHARC fiber is often coiled into a coil. In one embodiment, the coil radius can be between about 10 cm to about 20 cm. By coiling the fiber, the higher-order fast-axis modes in the fiber can be reduced. As a result, the lowest-order fast-axis mode can dominate all the higher-order fast-axis modes in the fiber laser. Furthermore, in one embodiment, fluorescence that may be generated in the fiber can be substantially blocked and absorbed after the fluorescence leaves the fiber laser. In addition to cooling the fiber, to removing the higher order modes in the fiber and/or to removing the fluorescence in the fiber, pump injection as well as signal access at two ends of the fiber can be provided. In addition, pump injection at several locations along the length of fiber can further be provided.

Figure 9:
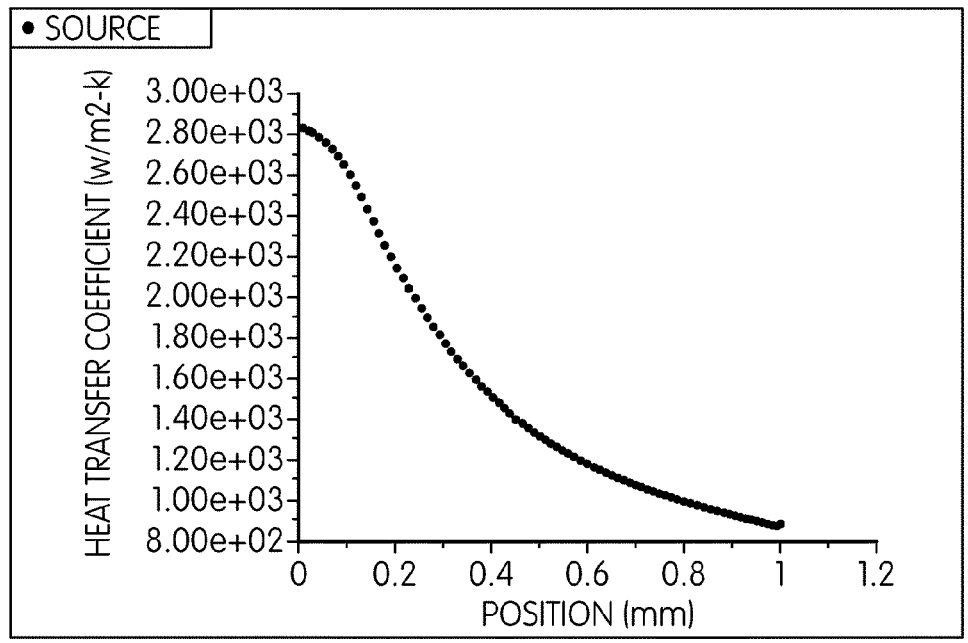
FIG. 9 shows a plot of a calculated heat transfer coefficient obtained when using a jet-cooling configuration, according to an embodiment.

By using a jet cooling configuration as discussed above, a fluid-jet (e.g., air-jet) pattern can be configured to control the transverse variation of the heat transfer coefficient. FIG. 9 shows a plot of a calculated heat transfer coefficient obtained when using a jet-cooling configuration, according to an embodiment. The ordinate of the plot corresponds to the heat transfer coefficient (in W/m²-K) and the abscissa corresponds to the position (in mm) relative to a center of the fluid-jet (in this example, air-jet). As shown in FIG. 9, the heat transfer coefficient has a Gaussian-like profile symmetric with respect to the center axis of the air-jet. As discussed in the above paragraphs, in conjunction with the ability to control the heat deposition profile within the $Yb^{3+}$ and $Pr^{3+}$ doped regions of the fiber by controlling the main and auxiliary pump beams, the jet cooling configuration can further allow tailoring the heat-transfer profile, hence provide another degree of freedom in optimizing the overall fiber laser system so as to achieve a desired transverse refractive index profile.

Figure 10:
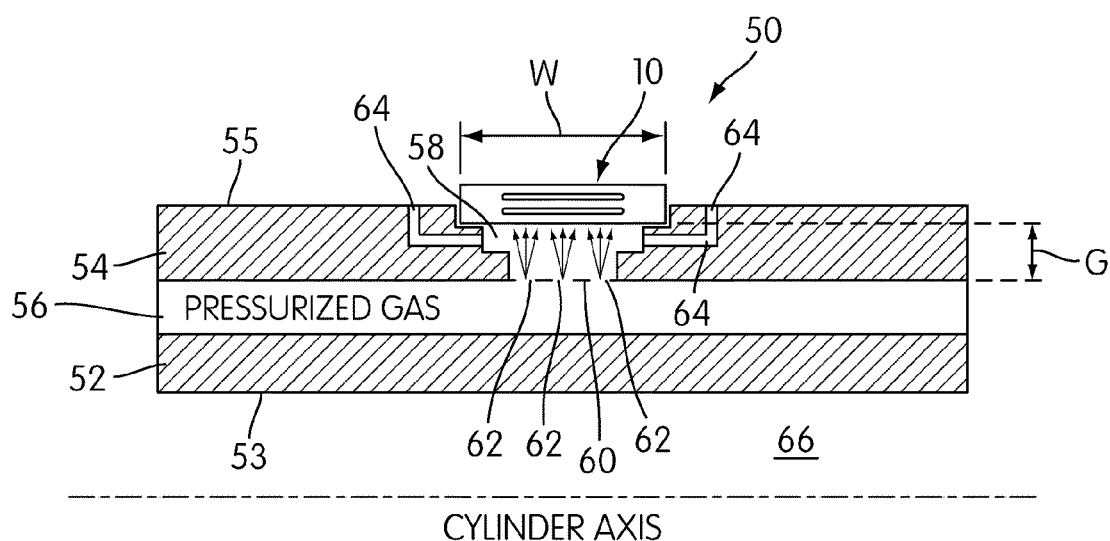
FIG. 10 is a schematic diagram of one configuration of a jet-impingement cooling arrangement, according to an embodiment.

FIG. 10 is a schematic diagram of one configuration of a fluid-jet (e.g., air-jet) impingement cooling arrangement 50, according to an embodiment. As shown in FIG. 10, cooling arrangement 50 includes two coaxial cylinders 52 and 54 disposed one inside another. In FIG. 10, only half of the cylinders 52 and 54 are shown relative to the longitudinal cylinder axis. A cross-section of the cylinder perpendicular to the cylinder axis can be circular, oval, or any other continuous geometrical shape. Pressurized fluid (e.g., gas such as air, carbon dioxide, nitrogen, argon, chlorofluorocarbons, etc.) is introduced in passageway 56 between inner cylinder 52 and outer cylinder 54. Fiber 10 (e.g., a SHARC fiber) is disposed in groove 58 formed in external surface 55 of outer cylinder 54. In one embodiment, groove 58 has substantially the same dimension as width W of fiber 10. In one embodiment, groove 58 has the same shape as the external cross-sectional shape of fiber 10. In one embodiment, groove 58 is formed in a spiral configuration on external surface 55 of outer cylinder 54. Foil 60 (e.g., a metal foil) provided with one or more nozzles 62 in a desired pattern is disposed at the bottom of groove 58. Fiber 10 is disposed in groove 58 over foil 62 and is spaced apart from foil 60 to form gap G therebetween. In one embodiment, foil 60 is provided with a continuous nozzle, a dashed nozzle, or a pattern of parallel nozzles 62, or any combination of two or more thereof so as to create a jet fluid flow. The fluid, for example, a gas such as air, nitrogen, argon, $CO_2$, chlorofluorocarbons, or the like, can be pressurized between cylinders 52 and 54 and is forced through nozzles 62 to exit through the nozzles as a jet of fluid (e.g., a jet of gas) to impinge a surface of fiber 10 that faces foil 60. The used fluid in gap 60 is vented outside of outer cylinder 54 by passing through exhaust ports 64 connecting cavity 59 to outside of outer cylinder 54. In another embodiment, groove 58 can be formed in inner surface 53 of inner cylinder 52. Fiber 10 is mounted to inner surface 53 of inner cylinder 52 in groove 58. Air introduced into passageway 56 between inner cylinder 52 and outer cylinder 54 is forced through nozzles provided in a foil to impinge a surface of fiber 10 in the same way as described above, and the used fluid is vented into hollow space 66 within inner cylinder 52 by passing through exhaust ports in the same manner as describe above.

Figure 11:
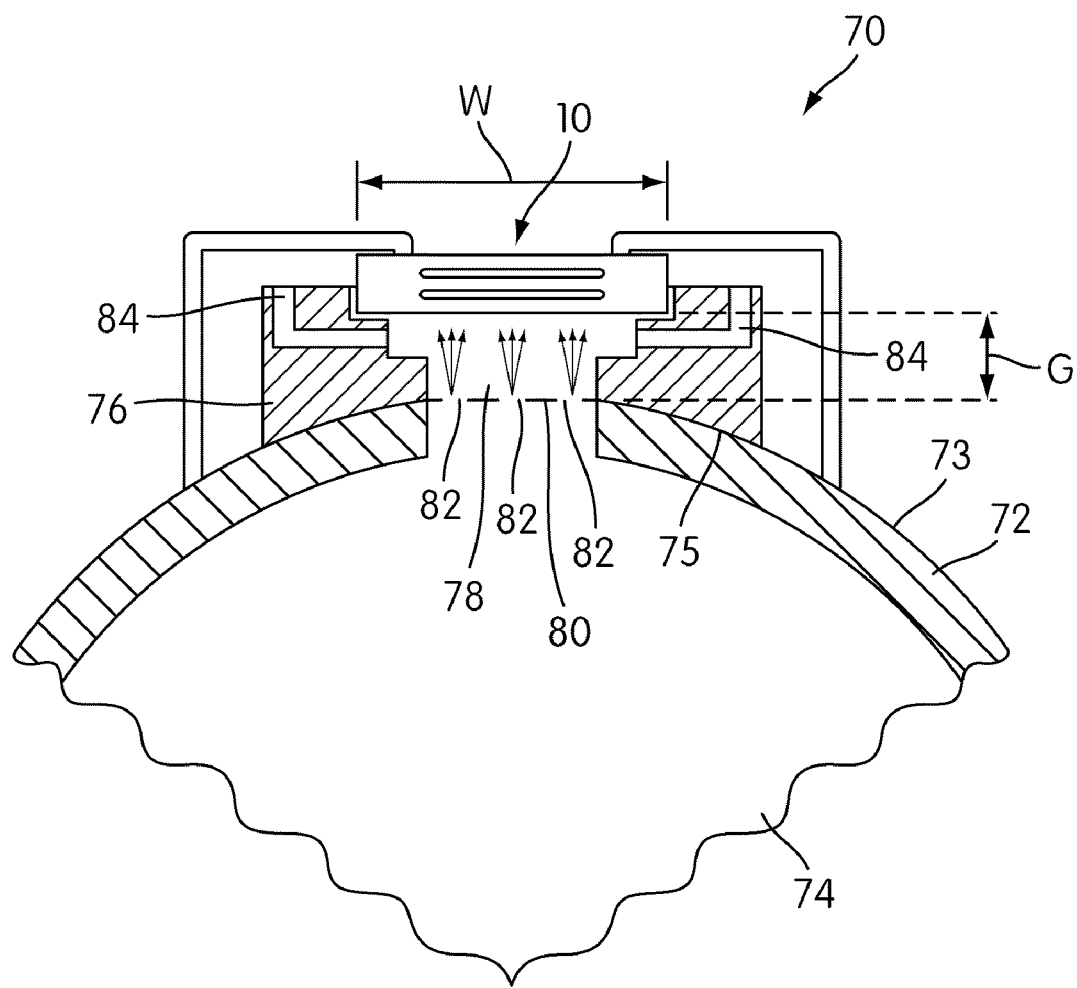
FIG. 11 is a schematic cross-sectional diagram of another configuration of a jet-impingement cooling arrangement, according to an embodiment.

FIG. 11 is a schematic cross-sectional diagram of another configuration of fluid-jet (e.g., air-jet) impingement cooling arrangement 70, according to another embodiment. As shown in FIG. 11, cooling arrangement 70 includes cylinder 72. Similar to the embodiment described in the above paragraph, a cross-section of cylinder 72 can be circular, oval, or any other continuous curved geometrical shape. Pressurized fluid (e.g., gas such as air) is introduced into hollow space 74 of cylinder 72. Fiber 10 (e.g., a SHARC fiber) is mounted to mounting assembly 76. Mounting assembly 76 is configured to be mounted to the cylinder or tube 72. The mounting assembly 76 has surface 75 that is shaped to mate with outer surface 73 of cylinder 72. Mounting assembly 76 has groove 78. Fiber 10 is disposed in groove 78. In one embodiment, groove 78 has substantially the same dimension as width W of fiber 10. In one embodiment, groove 78 has the same cross-sectional shape as the external cross-sectional shape of fiber 10. Foil 80 (e.g., a metal foil) may be provided with one or more nozzles 82 in a desired pattern and disposed on the bottom of groove 78. Fiber 10 is disposed in groove 78 above foil 80 and spaced apart from foil 80 to form gap G therebetween. In one embodiment, foil 80 can be provided with a continuous nozzle, a dashed nozzle, or a pattern of parallel nozzles, or any combination of two or more thereof so as to create a jet fluid flow. The fluid, for example, a gas such as air, nitrogen, argon, $CO_2$, chlorofluorocarbons, or the like, can be pressurized inside hollow space 74 of cylinder 72, and is forced through nozzles 82 to exit through nozzles 82 as a jet of fluid (e.g., a jet of gas) to impinge a surface of fiber 10 that faces nozzles 82. The used fluid in gap G is vented outside of mounting assembly 76 by passing through exhaust ports 84 provided in mounting assembly 76. Fiber holding fixture 88 holds fiber 10 against mounting assembly 76. In one embodiment, entire arrangement 70, including fiber 10, cylinder 72 and mounting assembly 76 can be configured to be flexible, and thus can be coiled as a whole around a common axis either as a free-standing spiral or as a spiral coiled around a structure. For example, the structure can include a set of parallel mounting rods forming a round (e.g., a circular or oval) pattern around which flexible cylinder 72, mounting assembly 76 and fiber 10 as a whole can be coiled.

An aspect of one embodiment enables effective control of the transverse index profile over the entire fiber length. Assuming that a given amount of sensible heat generates a particular transverse temperature profile, it is then possible to define a corresponding amount of guard heat that yields a complementary temperature profile. The guard heat temperature profile compensates the sensible heat temperature profile and results in a final temperature profile that is substantially uniform. This compensation will be most effective for a specific ratio of the local amounts of power absorbed by the active dopant and the absorber dopant. The excitation power P(z) absorbed by each of the respective dopants varies along the fiber length z according to the following equation (1):

$$P(z)=e^{-\alpha(\lambda)z}, \quad (1)$$

where $\alpha(\lambda)$ is the absorption coefficient, which depends on the respective excitation wavelength $\lambda$ and also on the transverse distribution of the respective dopants across the fiber cross-section. In general, the first radiation power, $P_1$, and the second radiation power, $P_2$, are different, and the respective absorption coefficients, $\alpha_1$ and $\alpha_2$, may be different as well. For such a general case, perfect compensation at one z location does not guarantee perfect compensation at another z location, because the ratio of $P_1$ to $P_2$ varies along z and deviates from the optimum complementary ratio. However, referring to equation (1), it can be seen that the ratio of $P_1$ to $P_2$ can be constant, independent of z, if the respective absorption coefficients are made equal (i.e., $\alpha_1=\alpha_2$). This equalization can be achieved by systematically varying the wavelength of the first radiation and/or the second radiation.

Several aspects of controlling the refractive index by controlling the temperature are described in the above paragraphs. However, according to yet another aspect of an embodiment, the refractive index can be controlled by other mechanisms. For example, the refractive index of a fiber containing a dopant depends not only on the dopant density or concentration, but also on the energy state of the dopant, i.e., on whether or not the absorber dopant ions are in the ground state or in at least one excited state, or both. The dependence of the refractive index on the energy state of the dopant (e.g. absorber dopant ions) arises from the fact that polarizability of the dopant, and hence the refractive index of the medium, is different for the excited state and the ground state. The degree of excitation of a population of dopants can be controlled by optical pumping, i.e., controlled by the wavelength and/or the power of excitation beam (main pump and/or auxiliary pump). In one embodiment, a population distribution of the absorber dopant ions among the ground energy state and the one or more excited energy states (excitation profile of the absorber dopant ions) can be controlled by an intensity or a wavelength or both of a radiation pump (main pump and/or auxiliary pump). By controlling the excitation profile of the absorber dopant ions, the refractive index along the at least one direction of the optical material can be tailored. Hence, the same scheme that can be employed to control the index profile using the thermal profile can be employed to control the index profile using the excitation profile, i.e., the power profile of the excitation beam and/or wavelength distribution in the excitation beam.

Controlling the index profile using the thermal profile and controlling the index profile using the excitation profile occur in different time scales. On one hand, thermal effects are relatively slow and occur within time frames of 1 ms. On the other hand, the degree of excitation from the ground state to an excited state can change on the atomic time scales that are in the microsecond range or even in the nanosecond range. Hence, control of the index profile using the excitation profile can be employed if desired on shorter time scales.

Certain aspects and features of embodiments have been described herein with reference to a SHARC fiber architecture. As it can be appreciated, aspects and features described herein are not limited to a SHARC fiber architecture, but extend to include other types of fiber architecture. For example, the index control described herein can be used in a fiber having a circular cross-section instead of the rectangular cross-section of the SHARC fiber.

Furthermore, as can be appreciated, the aspect of controlling the temperature to control the index profile or the aspect of controlling the excitation energy profile to control the index profile, described in the above paragraphs, are not limited to laser media, but can be applied in other optical media such as in an optical lens. For example, controlling the index by controlling the temperature can be used to adjust a focal length of an optical lens having fixed dimensions.

The above description has been provided for the purpose of illustration based on what are currently considered to be the most practical implementations, it is to be understood that such detail is solely for that purpose, and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the inventive concept.

What is claimed:

1. An optical device, comprising:
    an optical material comprising active dopant ions and absorber dopant ions spaced apart from the active dopant ions,
    wherein the active dopant ions are provided to absorb a first radiation and convert a portion of the first radiation into sensible heat, and
    wherein a concentration profile of the absorber dopant ions are selected to absorb a second radiation different from the first radiation and optionally the first radiation in at least one direction of the optical material so as to control a refractive index profile in the at least one direction of the optical material.

2. The optical device of claim 1, wherein the at least one direction of the optical material includes a slow axis direction of the optical material.

3. The optical device of claim 1, wherein the absorber dopant ions convert substantially at least a portion of the second radiation and optionally at least a portion of the first radiation into guard heat.

4. The optical device of claim 3, wherein the second radiation is selected to generate the guard heat to control the refractive index profile in the at least one direction of the optical material.

5. The optical device of claim 3, wherein the second radiation is selected to substantially complement the guard heat with the sensible heat such that an overall temperature is substantially uniform across the optical material in the at least one direction of the optical material.

6. The optical device of claim 3, wherein the second radiation is selected such that the refractive index of the optical material has a flat profile along the at least one direction of the optical material.

7. The optical device of claim 3, wherein a power of the second radiation, or a wavelength of the second radiation, or both is selected such that the refractive index of the optical material has a parabolic profile along the at least one direction of the optical material.

8. The optical device of claim 3, wherein a wavelength of the second radiation, or a power of the second radiation, or both is selected such that the refractive index of the optical material has a linear profile along the at least one direction of the optical material.

9. The optical device of claim 3, wherein the second radiation is controlled so as to reshape a profile of a "built-in" refractive index of the optical material along the at least one direction of the optical material.

10. The optical device of claim 1, wherein the optical material is a lasing material and the active dopant ions are active lasing dopant ions.

11. The optical device of claim 1, wherein the active dopant ions comprise Ytterbium, Erbium or both.

12. The optical device of claim 1, wherein the absorber dopant ions comprise Praseodymium, Dysprosium, or both.

13. The apparatus of claim 1, wherein the absorber dopant ions and the active dopant ions are complementarily distributed within the optical material such that a concentration of absorber dopant ions is greater in areas where a concentration of active dopant ion is lower.

14. The optical device of claim 13, wherein a concentration distribution of the active dopant ions in the optical material has a Gaussian-like distribution profile along the at least one direction of the optical material and a concentration distribution of the absorber dopant ions in the optical material along the at least one direction of the optical material has an inverted Gaussian-like distribution profile with a minimum in the inverted Gaussian-like distribution profile occurring at a maximum of the Gaussian-like distribution profile.

15. The optical device of claim 1, wherein a concentration distribution of active dopant ions in the optical material and a concentration distribution of absorber dopant ions in the optical material are selected such that the refractive index of the optical material has a flat profile along the at least one direction of the optical material.

16. The optical device of claim 1, wherein a concentration distribution of active dopant ions in the optical material, a concentration distribution of absorber dopant ions and optionally a concentration distribution of passive dopants in the optical material are selected such that the refractive index of the optical material has a parabolic profile along the at least one direction of the optical material.

17. The optical device of claim 1, wherein a concentration distribution of active dopant ions in the optical material and a concentration distribution of absorber dopant ions in the optical material are selected such that the refractive index of the optical material has a linear profile along the at least one direction of the optical material.

18. The optical device of claim 1, wherein a concentration distribution of active dopant ions in the optical material and a concentration distribution of absorber dopant ions in the optical material are continuous.

19. The optical-device of claim 1, wherein the absorber dopant ions substantially surround the active dopant ions.

20. The optical device of claim 1, wherein the active dopant ions substantially surround the absorber dopant ions.

21. The optical device of claim 1, wherein the optical material is an optical fiber comprising a core and a cladding.

22. The optical device of claim 21, wherein the active dopant ions are distributed in the core.

23. The apparatus of claim 21, wherein the absorber dopant ions are distributed in the core spatially separated from the active dopant ions.

24. The apparatus of claim 21, wherein the absorber dopant ions are distributed in the cladding.

25. The optical device of claim 21, wherein the cladding includes two claddings and the core is sandwiched between the two claddings.

26. The optical device of claim 25, wherein the optical fiber has a rectangular geometry and the core is semi-guiding and has a high aspect ratio.

27. The optical device of claim 25, wherein the aspect ratio is between approximately 30:1 and approximately 100:1.

28. The optical device of claim 25, wherein the optical fiber further comprises another cladding which surrounds the core and the two claddings.

29. The optical device of claim 28, wherein the optical fiber further comprises a coating substantially covering the cladding surrounding the core and the two claddings.

30. The optical device of claim 25, wherein the core and the two claddings are offset from a center axis of the optical fiber.

31. The optical device of claim 3, wherein the first radiation and the second radiation have different wavelengths.

32. The optical device of claim 3, wherein the first radiation has a wavelength centered around 976 nm, centered around 980 nm, or centered around a wavelength in a range between about 1480 nm and about 1530 nm.

33. The optical device of claim 3, wherein the second radiation has a wavelength centered around 1470 nm or centered around 1225 nm.

34. The optical device of claim 3, wherein the portion of the first radiation converted into sensible heat is approximately 8% of a power of the first radiation.

35. The optical device of claim 3, wherein a concentration distribution of the active dopant ions and a concentration distribution of the absorber dopant ion are selected so as to provide equal absorption rates of respectively the first radiation and the second radiation along a length of the optical material.

36. The optical device of claim 3, wherein the first radiation is generated by a primary radiation pump.

37. The optical device of claim 3, wherein the second radiation is generated by an auxiliary radiation pump.

38. The optical device of claim 3, wherein a power of the first radiation and a power of the second radiation are independently variable.

39. The optical device of claim 3, wherein the sensible heat has a Gaussian-like profile along the at least one direction of the optical material centered around a center of the optical material, and the guard heat has a complementary anti-Gaussian-like profile along the at least one direction of the optical material with a minimum of the anti-Gaussian-like profile of the guard heat occurring at a maximum of the Gaussian-like profile of the sensible heat.

40. The optical device of claim 3, wherein a wavelength of the first radiation, a wavelength of the second radiation, or both is selected to control a refractive index of the material along a length of the optical material.

41. The optical device of claim 3, wherein a wavelength of the first radiation, a wavelength of the second radiation, or both is selected to control the refractive index profile of the optical material along the at least one direction of the optical material.

42. The optical device of claim 3, wherein a power of the first radiation, a power of the second radiation, or both is selected to control the refractive index profile of the optical material along the at least one direction of the optical material.

43. The optical device of claim 1, wherein the absorber dopant ions include dopant ions in a ground energy state, in an excited energy state, or both.

44. The optical device of claim 43, wherein a population distribution of the absorber dopant ions among the ground energy state and at least one excited energy state controls the refractive index along the at least one direction of the optical material.

45. The optical device of claim 44, wherein the population distribution of the absorber dopant ions among the ground energy state and at least one excited energy state is controlled by controlling an intensity or a wavelength, or both of a pump radiation absorbed by the absorber dopant ions.

46. The optical device of claim 1, further comprising a cooling structure configured to control a heat transfer profile across the optical material in the at least one direction of the optical material.

47. The optical device of claim 46, wherein the cooling structure is configured to generate a fluid jet, the fluid jet being directed towards a surface of the optical material.

48. The optical device of claim 46, wherein the cooling structure comprises a first cylinder and a second cylinder disposed inside the first cylinder, the first cylinder having a groove formed at an external surface of the first cylinder, and wherein pressurized fluid is introduced in a passageway between the first and second cylinders.

49. The optical device of claim 48; wherein the groove is formed in a spiral configuration on the external surface of the first cylinder.

50. The optical device of claim 48, wherein the optical material is a rectangular fiber and wherein the groove is shaped to receive the rectangular fiber.

51. The optical device of claim 48, wherein the cooling structure further comprises a foil disposed at a bottom of the groove, the foil comprising one or more nozzles.

52. The optical device of claim 51, wherein the fiber is disposed in the groove spaced apart from the foil to form a gap therebetween.

53. The optical device of claim 52, wherein the gap, the nozzles or both are configured to provide a cooling rate profile along a slow axis direction of the fiber such that an overall temperature is substantially uniform across the fiber in the slow axis direction of the fiber.

54. The optical device of claim 52, wherein fluid in the passageway between the two cylinders is forced through the nozzles to expand inside the gap and impinge a surface of the optical material that faces the foil.

55. The optical device of claim 52, wherein the first cylinder comprises exhaust ports and fluid in the gap is vented outside of the first cylinder through the exhaust ports.

56. The optical device of claim 46, wherein the cooling structure comprises a first cylinder and a second cylinder disposed inside the first cylinder, the first cylinder having a groove formed on an internal surface of the second cylinder, and wherein pressurized fluid is introduced in a passageway between the first and second cylinders.

57. The optical device of claim 56, wherein pressurized fluid is vented through exhaust ports provided in the second cylinder to a hollow space inside the second cylinder.

58. The optical device of claim 46, wherein the cooling structure includes a cylinder configured to be filled with pressurized fluid, and a mounting assembly adapted to be mounted on the cylinder, the mounting structure having a groove configured to receive the optical material.

59. The optical device of claim 58, wherein the cooling structure further comprises a foil disposed at a bottom of the groove, the foil comprising one or more nozzles.

60. The optical device of claim 59, wherein the optical material is disposed in the groove spaced apart from the foil to form a gap therebetween.

61. The optical device of claim 60, wherein fluid inside the cylinder is forced through the nozzles to expand inside the gap to impinge a surface of the optical material that faces the foil.

62. The optical device of claim 61, wherein the mounting assembly comprises exhaust ports and the fluid in the gap is vented outside of the cylinder through the exhaust ports.

63. A method of controlling a refractive index profile in an optical material, the method comprising:
exciting active dopant ions in the optical material with a first radiation, the active dopant ions converting at least a portion of the first radiation into sensible heat; and
exciting absorber dopant ions in the optical material with a second radiation to control a refractive index profile in at least one direction of the optical material.

64. The method of claim 63, wherein exciting the absorber dopant ions comprises exciting absorber dopant ions in the optical material with the second radiation to generate guard heat.

65. The method of claim 64, wherein exciting the absorber dopant ions with the second radiation comprises selecting the second radiation to substantially equalize the guard heat with the sensible heat such that an overall temperature is substantially uniform across the optical material in the at least one direction of the optical material.

66. The method of claim 63, wherein exciting the absorber dopant ions with the second radiation comprises selecting the second radiation so as to obtain a substantially flat refractive index across the optical material in the at least one direction of the optical material.

67. The method of claim 63, wherein exciting the absorber dopant ions second radiation comprises controlling the second radiation so as to reshape a profile of a built-in refractive index of the optical material along the at least one direction of the optical material.

68. The method of claim 63, wherein said exciting the absorber dopant ions comprises exciting the absorber dopant ions from a ground energy state to an excited energy state.

69. The method of claim 68, further comprising controlling a population distribution of the absorber dopant ions among the ground energy state and at least one excited energy state to control the refractive index along the at least one direction of the optical material.

70. The optical device of claim 69, wherein controlling the population distribution of the absorber dopant ions among the ground energy state and at least one excited energy state comprises controlling the population distribution by controlling an intensity or a wavelength, or both of a pump radiation absorbed by the absorber dopant ions.

71. The method of claim 63, wherein the first radiation and the second radiation have different wavelengths.

72. The method of claim 63, wherein exciting the active dopant ions with the first radiation and exciting the absorber dopant ions with the second radiation comprises selecting a wavelength of the first radiation, selecting a wavelength of the second radiation, or both so as to control the refractive index profile of the optical material along the at least one direction of the optical material.

73. The method of claim 63, wherein exciting the active dopant ions with the first radiation and exciting the absorber dopant ions with the second radiation comprises selecting a power of the first radiation, selecting a power of the second radiation, or both so as to control the refractive index profile of the optical material along the at least one direction of the optical material.

74. The method of claim 63, further comprising cooling the optical material so as to control a heat transfer profile across the optical material in the at least one direction of the optical material.

75. The method of claim 63, wherein exciting the active dopant ions in the optical material with the first radiation comprises converting a portion of the first radiation into a signal laser radiation.

* * * * *